July 9, 1946.  F. J. LINGEL  2,403,809
FREQUENCY METER
Filed Aug. 22, 1941
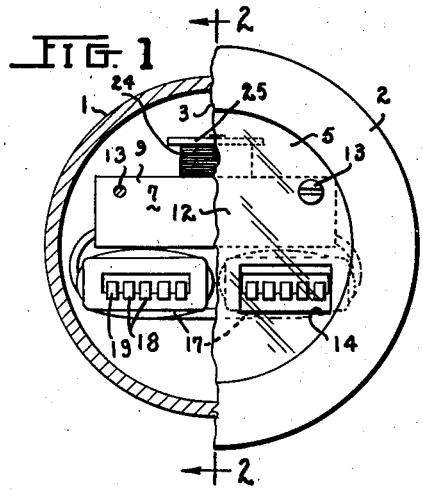
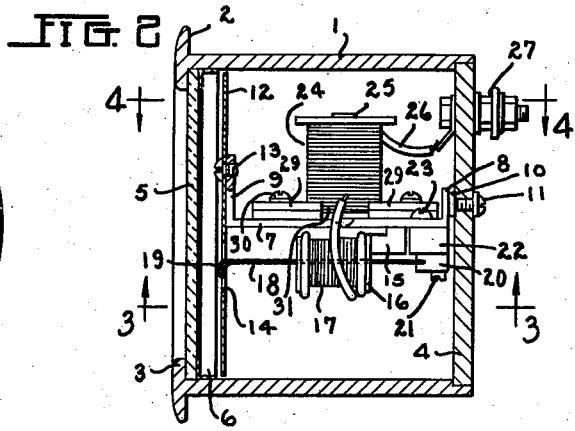
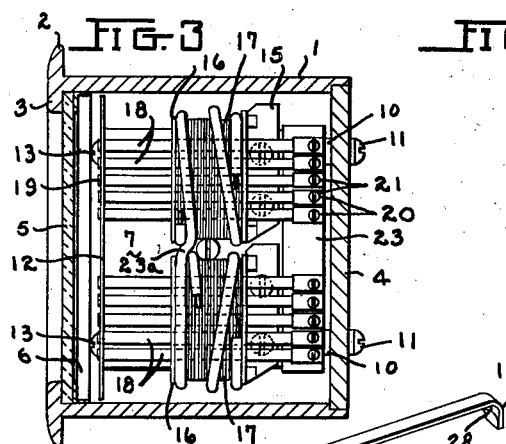
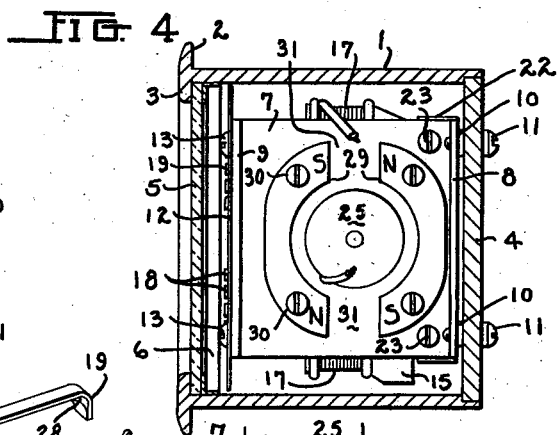
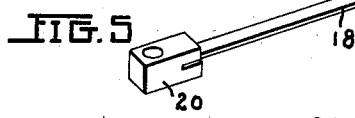
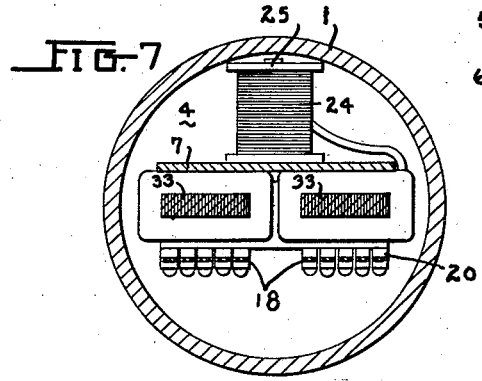
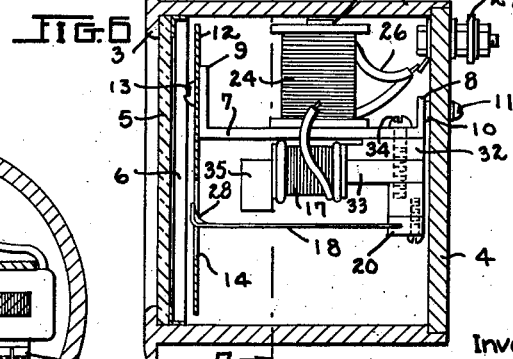
Inventor
FREDERICK J. LINGEL
by
Attorneys Patented July 9, 1946

2,403,809

UNITED STATES PATENT OFFICE 2,403,809

FREQUENCY METER

Frederick J. Lingel, Bluffton, Ohio, assignor to Ray L. Triplett, Bluffton, Ohio Application August 22, 1941, Serial No. 407,993

10 Claims. (Cl. 172—245)

1

The present invention relates to electrical measuring devices, and more particularly to frequency meters.

The primary object of the invention is to provide a meter for measuring the frequency of alternating currents or voltages, which meter is not only less expensive but more sensitive than the meters of the prior art. This object is attained, in brief, by superimposing on the reed which responds to the alternating magnetic field a magnetic bias of single direction, which cooperates with the alternating magnetic field in such a manner as to give a vigorous motion to the resonant reed.

Other objects and features will appear from the following description taken in connection with the drawing.

In the drawing:

Figure 1 is a plan view, partly broken away to expose the interior elements of one form of the improved frequency meter.

Figure 2 is a sectional view taken along the line 2—2 in Figure 1, but showing the internal elements in elevation.

Figure 3 is a view similar to Figure 2, but taken along the line 3—3 of Figure 2 to give a view of the internal elements from a different aspect.

Figure 4 is also a longitudinal sectional view but taken along the line 4—4 in Figure 2.

Figure 5 is a perspective view of the reed element employed in the improved instrument.

Figure 6 is a longitudinal sectional view of a modified form of the improved frequency meter.

Figure 7 is a transverse sectional view taken along the line 7—7 in Figure 6, and looking in the direction of the arrows.

Referring to Figures 1 to 4, the numeral 1 designates a cup-shaped casing provided with an outwardly extending flange 2 and an inwardly extending lip 3. The casing is preferably made of a non-magnetic metal, such as aluminum, brass, etc. and formed in two parts, the back plate 4 being fitted against a shoulder in the casing 1 and secured thereto in any suitable and well known manner. There is a flat glass plate 5 for viewing the vibratory movement of the reeds, this plate being held against the under side of the lip 3 by means of an upturned metal member 6 secured to the casing. Except for the glass plate and the member 6, all of the elements of the frequency meter are carried by the back plate 4. Consequently, the interior parts may be readily inspected and replaced, if necessary, by simply removing the back plate.

The internal elements are all carried on a flat

2 metal support 7, of a generally rectangular shape as indicated in Figure 4, this member being provided with flange portions 8, 9, the last-mentioned portion being somewhat wider than the flange portion 8. The flange 8 is mounted on the back plate by means of a pair of washers 10 and screws 11 which pass through the plate and are secured to the flange. The flange portion 9 carries a circular disc 12 by means of screws 13, this disc being provided with a pair of rectangular openings 14 shown in Figure 1. These openings register with the position that the reeds of the meter assume.

Any suitable type of bracket 15 depends from the under side of the support 7, this bracket carrying a frame 16, to which a pair of parallelly disposed solenoids 17 is secured. Each solenoid has an air core of rectangular shape in order to accommodate a plurality of parallelly disposed aligned vibratory reeds 18 which pass through the center of the solenoid. In the typical instrument illustrated five reeds are shown contained within each solenoid, each reed terminating at the end nearer the glass plate 5 in a downwardly extending flag 19, which in practice would be enameled white. The opposite end of each reed is preferably soldered within a groove formed in a reed mount 20, this mount being screwed, as indicated at 21, to a block 22, which in turn, is screwed as indicated at 23 to the flat portion of the support 7. Consequently, the support 7 carries ten reeds in two groups of five, and each group is surrounded by a solenoid 17.

The two solenoids or coils are connected in series and are wound in such a manner as to induce magnetic fields within the coils having polarities which are opposite when referred to corresponding ends of the coils. One of the coils is connected in series with a resistor 24 which is wound on a non-magnetic bobbin 25 and rests on the support 7. A wire 26 is taken from the free end of the resistor to a terminal 27, of any suitable and well known design and to which alternating voltage may be applied. The other side of the alternating current line is applied to the free end of one of the solenoids through a terminal (not shown) which is similar to the terminal 27 and is in a corresponding position with respect to the casing. The reeds 18 are given a different vibratory period either by adjusting their length, or preferably by providing a quantity of solder 28 on the under surface at the bend in the reed (Figure 5). By filing off different amounts of solder each reed can be made resonant to different frequencies. For example, the ten reeds may be made to respond respectively to unit frequencies from 55 to 65 cycles. If desired, the length of the reeds can be made progressively shorter to provide the range of frequency response.

When alternating voltage is applied to the solenoids 17 through the current limiting resistor 24, and assuming that the frequency of this voltage is 60 cycles per second, the reed 18 which is resonant to the 60-cycle vibration will be caused to flex in a vertical direction. The other reeds will remain substantially stationary or will have so little vibration that the vibratory motion of the 60-cycle reed can be readily separated from any of the other movements. These reeds are generally made of soft iron so as not to retain any residual magnetism which might introduce excessive hysteresis or other deleterious magnetic effect.

It has been found in practice that unless considerable current is passed through the coils 17, or unless the reeds are of impractically thin material, the resonant reed may not respond with such a movement as to provide a positive and distinguishing movement over the sympathetic vibrations of the remaining reeds. In other words, careful examination of the frequency meter may have to be made to determine which of all the reeds is vibrating with the greatest amplitude, and this determination is rendered even more difficult in case the applied frequency is not exactly in resonance with one particular reed but may have, for example, a half or a third frequency which falls between two adjacent reeds.

In order to increase the sensitivity of this type of frequency meter, and in accordance with the present invention, there is provided in the region of the vibratory reeds a pair of permanent magnets 29, one of which is formed in a C-shape and the other as a reverse C, these magnets being secured to the upper surface of the support 7 in any suitable manner, for example by the screws 30. The two magnets are spaced apart from one another, leaving a relatively long air gap 31 at each side, this air gap constituting a large leakage path for the magnetic lines of force passing through the gap from the north pole of one magnet to the south pole of the opposite magnet. These stray magnetic lines of force are constrained to pass, for the most part, through the reeds 18, thus providing a magnetic bias of constant magnitude in each of the reeds. It is apparent that when alternating voltage is applied to the coils 17 one of the half waves of that voltage will produce a magnetic field about each of the coils as will add to the leakage magnetic field moving between the respective pole pieces of the permanent magnets 29. Thus, during this half cycle of voltage the permanent magnets assist the magnetic fields within the coils 17 in producing a greater reaction on the respective reeds 18 causing one of them to vibrate violently when that particular reed is in substantial resonance with the frequency of the applied voltage. Consequently, each flag is caused to move in the vertical direction a much greater distance when its mechanical resonance characteristic coincides with the magnetic undulations produced by the coils 7. It is apparent that the magnets 29, in imparting increased sensitivity to the movement of the reeds and their flags, due to the interaction of their magnetic field with that produced by the applied voltages, may also be employed to provide certain adjustments in the sensitivity and therefore a certain amount of calibration in the operation of the moving parts.

In Figures 6 and 7 there is shown a modified construction in which, instead of employing a pair of permanent magnets which are exterior of the solenoids or coils, these magnets are incorporated in the coil structure by way of a core. In this modification the block 22 and the bracket 15 are made integral to form the block 32, and secured to this block there is a pair of bars 33, preferably of rectangular cross section and passing through the interior of the coils 17. These bars may be secured to the block 32 by means of screws 34. The bars 33 are each constituted as permanent magnets, and at their ends nearer the glass plate 5 there is a downwardly extending enlarged portion 35 which terminates at a position just above the reeds 18. As in the case of Figure 2, these reeds are flexibly mounted, but in Figure 6 the flags are illustrated as extending upwardly instead of downwardly. Each flag is provided with a calibrating gob of solder.

The operation of Figure 6 is quite similar to that explained in connection with Figure 4 in that the permanent magnets 33 serve magnetically to bias the individual reeds 18 so that the latter will respond with greater force when alternating voltage is applied to the coils 17. It is apparent that notwithstanding the reeds 18 are made of soft iron and therefore have little or no magnetism-retaining ability, there is always present within the reeds a certain amount of permanent magnetism induced either by the magnets 29 (Figure 4) or the magnetic bars or cores 33. Inasmuch as these bars practically fill the space within the coils 17 so that the latter are, in effect, tightly wound about the bars, these bars assist in carrying the alternating magnetic field to each reed 18, in addition to imparting to the reed a permanent magnetic effect. Consequently, the modification shown in Figure 6 is extremely efficient in operation. In view of the fact that the reeds 18 respond to the combined alternating and permanent magnetic fields, it is desirable that the entire containing and supporting structure be made of a non-magnetic material such as aluminum, copper, or if desired, Bakelite.

From the foregoing it is evident that I have disclosed an improved form of frequency meter in which the reed 18 having a resonant characteristic corresponding to the frequency of the applied voltage will move so violently in the vertical direction as unmistakably to distinguish its specific movement from the movements of the adjacent reeds. It is therefore possible to obtain greater accuracy in the proper determination of frequencies of electric currents or voltages.

It will be understood that I desire to comprehend within my invention such modifications as come within the scope of the claims and the invention.

Having thus fully described my invention, what I claim as new and desire to secure by Letters Patent, is:

1. A frequency meter comprising a plurality of metal reeds having different vibratory periods, one end of each reed being fixed and the other end being free to vibrate, a solenoid with an air core surrounding said reeds and adapted to receive alternating current the frequency of which is to be determined, and a pair of magnets spaced from one another to leave an air gap, said magnets having a C-shape and positioned reversely with respect to one another in a plane parallel and closely adjacent to the plane of the reeds.

2. A frequency meter comprising a plurality of metal reeds having different vibratory periods, one end of each reed being fixed and the other end being free to vibrate, a solenoid with an air core surrounding said reeds and adapted to receive alternating current the frequency of which is to be determined, and a pair of magnets spaced from one another to leave an air gap, the magnetic lines of force which flow across said gap having the same direction as the direction of the magnetic field induced in each reed by said solenoid, said magnets having a C-shape and positioned inversely with respect to one another in a plane parallel to the plane of the reeds, the oppositely magnetized poles of said C-shaped magnets being positioned adjacent one another.

3. In a frequency meter, two reeds of magnetic material, each reed being fixed at one end only, a pair of oppositely wound solenoids inductively related to the respective reeds, said solenoids being electrically connected in series and adapted for connection in an external circuit whose frequency is to be measured, two magnets having unlike poles adjacent but spaced from each other, each pair of unlike poles being inductively related to a respective reed and spaced to provide a field therebetween having a component parallel to and adjacent the axis of a respective solenoid.

4. In a frequency meter, two sets of reeds of magnetic material, each reed being secured to a support at one end only and having its other end free to vibrate the reeds of each set being parallel, a pair of oppositely wound solenoids electrically connected, each solenoid being inductively related to a respective set of reeds, and a pair of magnets having unlike poles adjacent one another but spaced to form two air gaps, the poles of each pair of said unlike poles being spaced to create a field substantially parallel to and adjacent the magnetic axis of a respective solenoid.

5. A frequency meter comprising a casing, a support in said casing, two sets of reeds of magnetic material, means attaching one end only of each reed to said support whereby their free ends may vibrate, the reeds of each set being substantially parallel, two oppositely wound electrically connected solenoids carried by said support and a pair of magnets having unlike poles adjacent one another but spaced to form air gaps, each said pair of unlike poles being inductively related to a respective set of reeds each pair of poles being positioned adjacent a respective solenoid to induce a field parallel to the magnetic axis thereof.

6. In a frequency meter, two sets of reeds of magnetic material, each reed being secured to a support at one end only and having its other end free to vibrate, a pair of electrically connected oppositely wound solenoids inductively related to the respective sets of reeds, and a pair of magnets having unlike poles adjacent but spaced to form two air gaps, each pair of said unlike poles being inductively related to a respective set of reeds and positioned adjacent a respective solenoid to induce a field parallel to the magnetic axis thereof, the reeds of each set being substantially parallel and each solenoid surrounding its respective set of reeds.

7. In a frequency meter, a support, a plurality of sets of reeds, each reed having one end fixed to said support, the reeds of each set being parallel and having their free ends in alignment, each reed having a different period of vibration, a plurality of coils carried by said support each coil loosely surrounding a respective set of reeds, said coils being connected in series to a pair of terminals, and a pair of permanent magnets on said support having adjacent but spaced unlike poles, each pair of poles being closely adjacent a respective set of reeds, said reeds and permanent magnets lying in closely spaced substantially parallel planes.

8. A frequency meter comprising a support, a plurality of substantially coplanar reeds of magnetic material each having a different period of vibration, means rigidly connecting said reeds at one end to said support, a solenoid attached to said support at one side thereof, said solenoid surrounding all of said reeds intermediate their ends, terminals to which the ends of said solenoids are respectively connected, two U-shaped magnets on said support in a plane parallel to and closely adjacent the plane of said reeds, said magnets having adjacent spaced unlike poles, one pair of said unlike poles being inductively related to each of said reeds.

9. A frequency meter comprising a support, a plurality of substantially parallel and coplanar reeds of magnetic material, means fixing each reed at one end to said support, said fixed ends being adjacent, the free ends of the reeds being adapted to act as indicators, a solenoid carried by said support, said solenoid being closely adjacent and directly inductively coupled to said reeds, means whereby the terminals of said solenoid may be connected into an external circuit whose frequency is to be measured, and two polarizing magnets secured to said support, having a pair of spaced unlike poles closely adjacent said reeds and spaced to create a magnetic field at said solenoid having a component parallel to the magnetic axis thereof.

10. In a frequency meter, a casing, a support carried by said casing, a plurality of parallel, substantially coplanar reeds of magnetic material all reeds being fixed at one end only to said support said ends being adjacent, the free ends of said reeds being viewable through an opening in said casing, a bracket mounted in said support, a coil on said bracket, said coil surrounding said reeds intermediate their ends, means whereby said coil may be connected to an external circuit whose frequency is to be measured, and a magnet on said support having spaced poles located adjacent said reeds whereby a portion of the space flux from said magnet flows through said reeds and generally parallel to the magnetic axis of said coil.

FREDERICK J. LINGEL.